US010015840B2

(12) United States Patent
Pratt et al.

(10) Patent No.: US 10,015,840 B2
(45) Date of Patent: *Jul. 3, 2018

(54) DISENGAGING MOVEMENT ASSISTANCE

(71) Applicants: AT&T Intellectual Property I, L.P., Atlanta, GA (US); AT&T Mobility II LLC, Atlanta, GA (US)

(72) Inventors: James H. Pratt, Round Rock, TX (US); Greg W. Edwards, Austin, TX (US); Michael Lattanzi, Bothell, WA (US); Constance Missimer, Seattle, WA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/701,355

(22) Filed: Sep. 11, 2017

(65) Prior Publication Data

US 2018/0103506 A1  Apr. 12, 2018

Related U.S. Application Data

(63) Continuation of application No. 15/289,784, filed on Oct. 10, 2016, now Pat. No. 9,763,285.

(51) Int. Cl.
*H04B 7/00* (2006.01)
*H04W 84/18* (2009.01)
(Continued)

(52) U.S. Cl.
CPC ............ *H04W 84/18* (2013.01); *G06F 3/017* (2013.01); *G10L 15/22* (2013.01); *G10L 2015/223* (2013.01)

(58) Field of Classification Search
CPC ........ H04W 84/18; G06F 3/017; G10L 15/22; G10L 2015/223
See application file for complete search history.

(56) References Cited

U.S. PATENT DOCUMENTS 6,673,027 B2  1/2004  Fischer
7,210,240 B2  5/2007  Townsend et al.
(Continued)

FOREIGN PATENT DOCUMENTS

WO  WO 2015/060894  4/2015
WO  WO 2015/108701  7/2015

OTHER PUBLICATIONS

Appelboom, Geoff, et al. "Smart wearable body sensors for patient self-assessment and monitoring." Archives of Public Health vol. 72 Issue 1 (Aug. 2014). 12 Pages. http://archpublichealth.biomedcentral.com/articles/10.1186/2049-3258-72-28.
(Continued)

*Primary Examiner* — Xin Jia

(57) ABSTRACT

A device, non-transitory computer-readable medium, and method for disengaging a corrective action via a wearable unit are disclosed. In one example, a processor may receive a movement model for a type of motion of a user, collect sensor data associated with the type of motion of the user from a plurality of sensors of a wearable unit, and determine that the sensor data is not in accordance with the movement model. The processor may further provide a corrective action via the wearable unit in accordance with the movement model when it is determined that the sensor data is not in accordance with the movement model, detect a triggering condition for disengaging the corrective action, and disengage the corrective action when the triggering condition is detected.

20 Claims, 4 Drawing Sheets

(51) Int. Cl.
*G06F 3/01* (2006.01)
*G10L 15/22* (2006.01)

(56) References Cited

U.S. PATENT DOCUMENTS

| | | |
|---|---|---|
| 7,616,110 B2 | 11/2009 | Crump et al. |
| 7,993,291 B2 | 8/2011 | Karkanias et al. |
| 8,138,926 B2 | 3/2012 | Bomba et al. |
| 8,217,797 B2 | 7/2012 | Ikoyan |
| 8,414,507 B2 | 4/2013 | Asada |
| 8,647,270 B2 | 2/2014 | LeBoeuf et al. |
| 8,678,979 B2 | 3/2014 | Stark et al. |
| 8,751,253 B2 | 6/2014 | Breslau et al. |
| 8,753,275 B2 | 6/2014 | Najafi et al. |
| 8,827,930 B2 | 9/2014 | Wekell |
| 8,830,162 B2 | 9/2014 | Helmer |
| 8,845,556 B1 | 9/2014 | Schickler et al. |
| 8,932,236 B1 | 1/2015 | McKeon et al. |
| 8,945,328 B2 | 2/2015 | Longinotti-Buitoni et al. |
| 9,101,323 B2 | 8/2015 | Einarsson |
| 9,282,893 B2 | 3/2016 | Longinotti-Buitoni et al. |
| 9,311,789 B1 | 4/2016 | Gwin |
| 2006/0025229 A1 | 2/2006 | Mahajan et al. |
| 2008/0281550 A1 | 11/2008 | Hogle et al. |
| 2009/0137933 A1 | 5/2009 | Lieberman et al. |
| 2015/0272511 A1 | 10/2015 | Najafi et al. |
| 2016/0089083 A1 | 3/2016 | Sutton |

OTHER PUBLICATIONS

"FlexVolt Bluetooth Sensor." Flexvolt, flexvoltbiosensor.com, accessed Jul. 2016. 2 Pages. http://www.flexvoitbiosensor.com/products.

"Force Feedback for Physical Therapy Training." Tekscan®, tekscan.com, accessed Jul. 2016. 3 Pages. https://www.tekscan.com/applications/force-feedback-physical-therapy-training.

DISENGAGING MOVEMENT ASSISTANCE

This application is a continuation of U.S. patent application Ser. No. 15/289,784, filed Oct. 10, 2016, now U.S. Pat. No. 9,763,285, which is herein incorporated by reference in its entirety.

The present disclosure relates generally to network-connected wearable sensor devices, and more particularly to devices, computer-readable media, and methods for disengaging a corrective action via a wearable unit.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
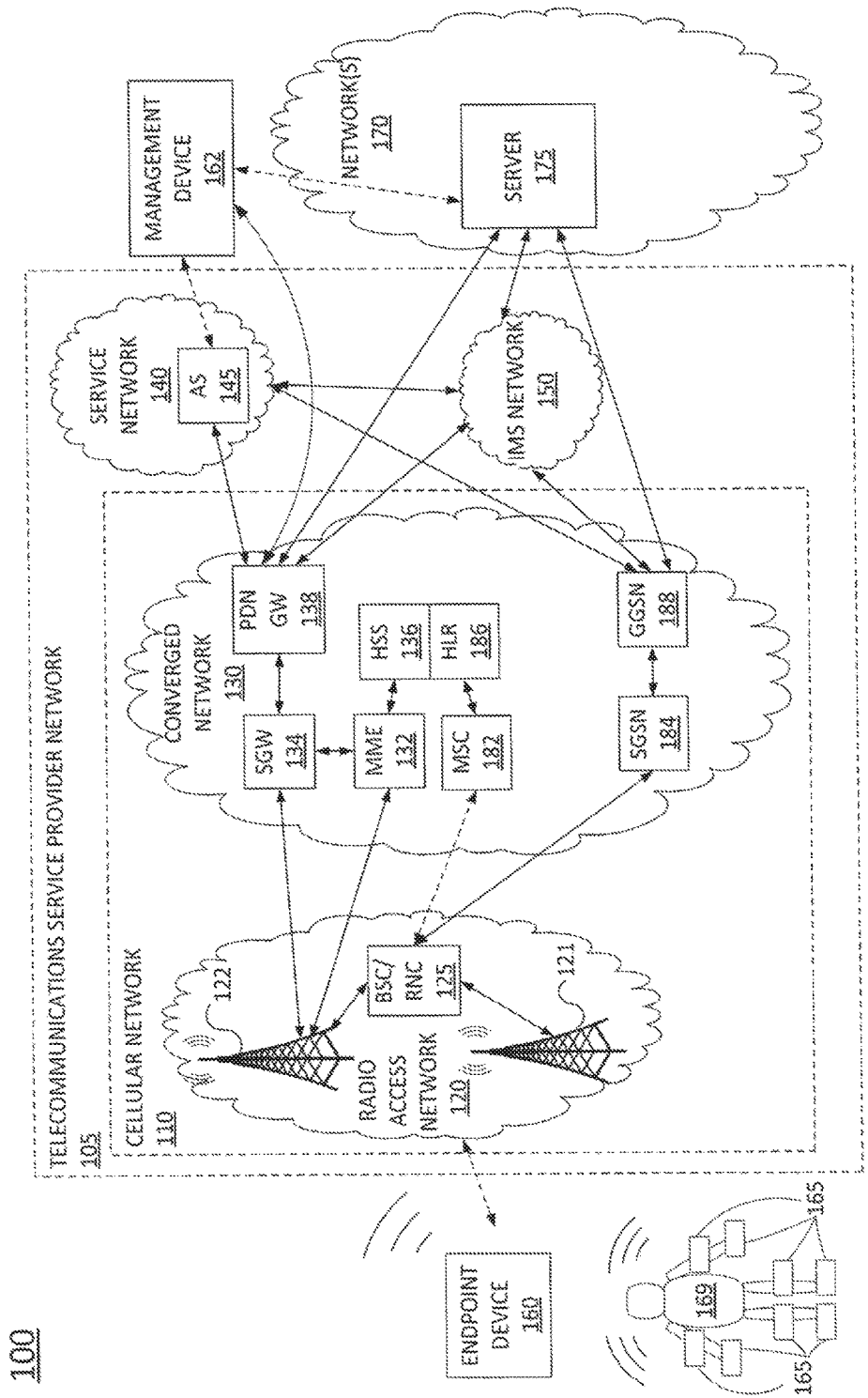
FIG. 1 illustrates an example system related to the present disclosure.

The present disclosure broadly discloses devices, computer-readable media, and methods for disengaging a corrective action via a wearable unit. In one example, a processor may receive a movement model for a motion of a user, collect sensor data associated with the motion of the user from a plurality of sensors of a wearable unit, and determine that the sensor data is not in accordance with the movement model. The processor may further provide a corrective action via the wearable unit in accordance with the movement model when it is determined that the sensor data is not in accordance with the movement model, detect a triggering condition for disengaging the corrective action, and disengage the corrective action when the triggering condition is detected.

While exercising, people are frequently off balance without realizing it. This can lead to injuries that may take weeks to months of rehabilitation to correct and may include doctor visits, prosthetics in shoes, rehabilitation exercises, and loss of time engaging in beneficial exercise or work. Examples of the present disclosure include wearable units that communicate with network-based devices, e.g., via a user's mobile phone. For example, wearable units on the user's body may include sensors to monitor conditions and send status information to the user's mobile device and/or a network-based device. Examples of the present disclosure may also utilize specific posture or movement data from a caregiver, such as a chiropractor or a physical therapist in the case of rehabilitating an injury, for instance. In one example, the correct posture or movement data is collected/recorded via a user's wearable unit when the user is with the caregiver for later usage as a movement model.

In one example, audio or visual feedback may be provided to the user if the user's posture and/or performance of a movement is not correct, e.g., as defined in a movement model. For instance, a text message, a voice message, or any other multimedia message may provide corrective instructions to the user, such as to hold up the user's head or to stop favoring the user's right foot. In another example, feedback may be provided from the user's mobile device and/or the network-based device via a wearable unit to stimulate muscles/nerves. For instance, the wearable unit may vibrate or provide a gentle electrical stimulation to alert the user to a problem with the user's posture. Examples of the present disclosure may also account for the time of day, the user's recurring schedule/activities, a length of time in the position and how that should affect the posture of the user, and so forth.

In one example, the present disclosure also provides a corrective action via a wearable unit. For instance, the wearable unit may include one or more actuators which may be engaged to resist and/or to prevent certain motions, or to perform an example motion in accordance with a movement model. Examples of the present disclosure therefore include a combination of sensor data-gathering and subsequent corrective action by engaging actuators of a wearable unit. Examples of the present disclosure also provide for a user to override a corrective action. For instance, in one example, if the correction is unwanted, the user can say a keyword or use an unobtrusive physical gesture (e.g., curl both pinky fingers), to stop the correction of the movement. These and other aspects of the present disclosure are discussed in greater detail below in connection with the examples of FIGS. 1-4.

It should be noted that as referred to herein, the term "session" includes a sequence or flow, comprising one or more packets, segments, datagrams, frames, cells, protocol data units, service data unit, bursts, and so forth, as well as control and management communications related to the establishment, continuity, and termination of the session. The particular terminology or types of data units involved may vary depending upon the underlying network technology. Thus, the term "packet" is intended to refer to various types of data units that may comprise a session or flow. In addition, the terms "configure", and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

To better understand the present disclosure, FIG. 1 illustrates an example network, or system 100 that may implement examples of the present disclosure for disengaging a corrective action via a wearable unit. In one example, the system 100 includes a telecommunications service provider network 105. The telecommunications service provider network 105 may comprise a cellular network 110, a service network 140, and an Internet Protocol (IP) Multimedia Subsystem (IMS) network 150. The system 100 may further include other networks 170 connected to the telecommunications service provider network 105. As shown in FIG. 1, the system 100 may connect endpoint device 160 with server 175 in networks 170, application server (AS) 145 in service network 140, and/or a management device 162. The endpoint device 160 may comprise a cellular telephone, a smartphone, a tablet computing device, a laptop computer, a pair of computing glasses, a wireless enabled wristwatch, or any other cellular-capable mobile telephony and computing device (broadly, an "endpoint device"). For instance, endpoint device 160 may be an endpoint device of a user 169 having one or more wearable units 165. In one example, endpoint device 160 may communicate with cellular network 110 using multiple cellular communication technologies, such as GSM/time-division multiple access (TDMA) communications, wideband code division multiple access (WCDMA), CDMA2000 communications, orthogonal frequency division multiple access (OFDMA), and the like, over various frequency bands.

Wearable unit(s) 165 may include, for example, a sling, a brace, or the like which may simultaneously provide support to and allow movement of one or more portions of the user 169. In accordance with the present disclosure, wearable unit(s) 165 may include at least one sensor, such as: a pressure sensor, a magnetometer, a compass, a gyroscope, an accelerometer, a piezoelectric transducer, a magnetic gate, or a light gate. For instance, one or more sensors of wearable unit(s) 165 may be for detecting movements and/or a posture or a position of one or more bodily portions of the user 169. Wearable unit(s) 165 may also include, at least one actuator comprising: an electric actuator, a hydraulic actuator, or a variable force solenoid. In addition, wearable unit(s) 165 may include at least one transceiver for communicating with the endpoint device 160. For instance, the transceiver may comprise a wireless transceiver for Institute of Electrical and Electronics Engineers (IEEE) 802.11 based communications (e.g., "Wi-Fi"), IEEE 802.15 based communications (e.g., "Bluetooth", "ZigBee", etc.), or the like, where the endpoint device 160 may be similarly equipped. Alternatively, or in addition, wearable unit(s) 165 may connect to endpoint device 160 via one or more wired connections, such as via a universal serial bus (USB) cable, or the like. In one example, the sensor(s) of wearable unit(s) 165 may provide sensor readings to endpoint device 160 and the actuator(s) of wearable unit(s) 165 may receive control signals from endpoint device 160, as described in greater detail below. In one example, a wearable unit may comprise a single component, or one or more separate components which together comprise the wearable unit. In another example, different components may be considered as separate wearable units. An example wearable unit 200 is illustrated in greater detail in FIG. 2 and as described below.

In one example, management device 162 may comprise a same type of device as endpoint device 160. In another example, management device 162 may comprise a different type of device, such as a desktop computer, a server, a laptop computer, or a different type of non-cellular enabled device. In one example, the management device may be associated with a caregiver, such as a relative, a doctor, a nurse, a physical therapist, or a trainer of the user 169. For instance, the caregiver may be a user of the management device 162 and may be responsible for a physical rehabilitation, exercise regimen, or other types of movement training of the user 169 who may be recovering from an injury, stroke, or other health related issues, or who may be training for overall health improvement, preventative strengthening, and so forth. Management device 162 may configure one or more movement models for wearable unit(s) 165 of the user 169 via a server for movement assistance, e.g., server 175 and/or AS 145, as described in greater detail below.

In one example, the cellular network 110 comprises a radio access network 120 and a converged network 130, e.g., a cellular core network with components for 2G-5G and beyond architectures. For example, as illustrated in FIG. 1, radio access network 120 may include Universal Mobile Telecommunications System (UMTS) terrestrial radio access network (UTRAN), evolved UTRAN (eUTRAN), and Global System for Mobile communication (GSM) radio access network (GRAN)/base station subsystem (BSS) components, while converged network 130 may include evolved packet core (EPC) network components, and network switching subsystem (NSS)/GSM core network and/or General Packet Radio Service (GPRS) core network components. For example, component 121 in radio access network 120 may comprise a base transceiver station (BTS) and a NodeB, e.g., a base station site with both 2G and 3G components. Component 122 may comprise a BTS, NodeB, and an eNodeB. In other words, component 122 may comprise a base station site with 2G, 3G, 4G/LTE and 5G components. As illustrated in FIG. 1, radio access network 120 further includes a base station controller (BSC)/radio network controller (RNC) 125, which may perform a variety of wireless network management related tasks such as wireless channel assignments, determining transmission power levels, controlling handovers from one base station to another base station, concentrating multiple signals from endpoint devices for onward transmission to other portions of the radio access network 120, or converged network 130, and to perform other functions. In the present example, BSC/RNC 125 may coordinate 2G and 3G communications such as GSM/TDMA communications, WCDMA or CDMA2000 communications, and the like via components 121 and 122.

In one example, converged network 130 provides various functions that support wireless services in the 2G-4G/LTE environment. For instance, network devices Mobility Management Entity (MME) 132 and Serving Gateway (SGW) 134 provide various functions for LTE-based communications. For example, MME 132 is the control node for the LTE access networks, such as eUTRAN portions of radio access network 120 (e.g., eNodeBs). In one embodiment, MME 132 is responsible for user equipment (UE)/endpoint device tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G network portions. For LTE-based communications, converged network 130 may also include a Home Subscriber Server (HSS) 136 that contains subscription-related information (e.g., subscriber profiles), performs authentication and authorization of a wireless service user, and provides information about the subscriber's location. The converged network 130 may also comprise a packet data network (PDN) gateway 138 which serves as a gateway that provides access between the converged network 130 and various data networks, e.g., service network 140, IMS network 150, networks 170, and the like. The packet data network gateway 138 is also referred to as a PDN gateway, a PDN GW or a PGW. In one example, the LTE/EPC portions of converged network 130 may comprise an Internet Protocol (IP)/multi-protocol label switching (MPLS) backbone that supports both real-time and non-real-time service delivery.

As mentioned above, converged network 130 may also include NSS/GSM core network and/or GPRS core network components. For example, converged network 130 may include one or more mobile switching centers (MSCs) for each wireless access network that forms part of the system 100, such as MSC 182 for radio access network 120. The converged network 130 may further include one or more home location registers (HLRs), such as HLR 186, which functions as a central repository of authentication and service validation information, subscription information, and other information pertaining to user subscriptions and services. Similarly, respective visiting location registers (VLRs) may be integrated within each MSC, and may function as temporary repositories of authentication and service validation information, subscription information, and other information pertaining to visiting user subscriptions and services when an endpoint device is located in a particular geographic region serviced by a particular MSC/VLR. For example, MSC 182 may be designated to serve and administer a first coverage area including radio access network 120. Thus, MSC 182 may maintain, e.g., in a VLR, user profile records for endpoint devices currently serviced by base stations within the portion of the network that is the responsibility of MSC 182 (e.g., endpoint device 160).

Converged network 130 may also include GPRS network elements for handling data calls to and from endpoint devices. Such network elements may include a serving GPRS support node (SGSN) 184, a gateway GPRS support nodes (GGSN) 188, and related support components including media servers, application servers, and the like. An SGSN refers to a network node responsible for communicating with endpoint devices and routing of data calls. Similar to MSC 182, SGSN 184 may have specific coverage areas and be assigned to handle specific wireless access networks of the system 100. A GGSN refers to a network node responsible for the interworking between a GPRS network (e.g., components of converged network 130 that support GPRS services and functionality) and external packet switched networks, e.g., service network 140, IMS network 150, and networks 170. Thus, FIG. 1 illustrates various connections between GGSN 188 and other components of system 100. In one example, the GPRS portions of converged network 130 may comprise an IP/MPLS.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the networks 170 may include different types of networks. In another example, the networks 170 may be the same type of network. In one example, server 175 is accessible to endpoint device 160 and/or management device 162 via telecommunications service provider network 105 and/or other networks 170. As illustrated in FIG. 1, server 175 may connect to telecommunications service provider network 105 via IMS network 150, or via PDN GW 138 and/or GGSN 188 in converged network 130. For instance, a communication from server 175 to endpoint device 160 may comprise an IP packet, or a stream of IP packets to GGSN 188, which may be forwarded to endpoint device 160 via SGSN 184, BSC/RNC 125, and one of components 121 or 122 (e.g., a NodeB portion of component 121 or component 122), while a communication from endpoint device 160 to server 175 may follow a reverse path. In another example, a communication from server 175 to endpoint device 160 may include the media server sending a stream of IP packets to PDN GW 138, which may be forwarded to endpoint device 160 via SGW 124, and component 122 (e.g., an eNodeB portion of component 122), while a communication from endpoint device 160 to server 175 may follow a reverse path. In one example, server 175 may comprise a computing system, such as computing system 400 depicted in FIG. 4, specifically configured to perform various steps, functions, and/or operations in connection with examples of the present disclosure for disengaging a corrective action via a wearable unit.

In one example, service network 140 may comprise one or more devices for providing services to subscribers, customers, and or users. For example, telecommunications service provider network 105 may provide a cloud storage service, web server hosting, and other services. As such, service network 140 may represent aspects of telecommunications service provider network 105 where infrastructure for supporting such services may be deployed. As illustrated in FIG. 1, service network 140 includes an application server (AS) 145. In one example, AS 145 may comprise a computing system, such as computing system 400 depicted in FIG. 4, specifically configured to perform various steps, functions, and/or operations for disengaging a corrective action via a wearable unit, in accordance with the present disclosure.

In one example, management device 162 may access a server for movement assistance, e.g., AS 145 and or server 175 to configure one or more movement models for wearable unit(s) 165 of user 169. Notably, AS 145 or server 175 may perform the same or similar operations in different examples of the present disclosure. Thus, the following example is described primarily in connection with AS 145. However, it should be noted that the server 175 may be substituted to perform the same or similar functions as the AS 145 in the following description. To illustrate, AS 145 may store in an integrated or attached memory one or more movement models which may represent preferred or ideal motions for the user 169 to engage in. A movement model may comprise, for example, a series of states which may be associated with or correspond to sensor readings of the one or more sensors of the wearable unit(s) 165. The movement model may also include one or more states which are indicative of a risk of injury or a danger to the user 169. For instance, the wearable unit(s) 165 may comprise an elbow brace, while a corresponding movement model may indicate a series of states comprising a correct rowing motion. Alternatively, or in addition, the movement model may also comprise one or more states (e.g., corresponding to one or more sensor readings) which indicate a hyperextension condition, or a similarly improper motion and/or a posture/position which may present a risk to the user 169.

In one example, the movement model may be created via wearable unit(s) 165. For instance, a caregiver associated with management device 162 may have user 169 engage in a controlled movement which can be captured as inputs to the movement model via sensor readings of the sensor(s) of wearable unit(s) 165. In one example, the sensor readings of the wearable unit(s) 165 may be transferred to AS 145 via endpoint device 160 and stored as inputs to the movement model. In another example, the sensor readings may be transferred to AS 145 via management device 162. For instance, the wearable unit(s) 165 may be connected (e.g., via Bluetooth, a wired connection, etc.) with management device 162 while the user 169 is present at a location with the caregiver and the management device 162, e.g., at an office of a physical therapist, a doctor, etc. In another example, a movement model may be generated via a different set of equipment, such as one or more wearable units of an expert performing an example motion, loaded into AS 145, and stored for use in connection with user 169 and various other users. For instance, AS 145 may store a library of various movement models for various types of motions, for one or more users, for various categories of users, and so forth.

In one example, the movement model may be loaded into endpoint device 160 in order to configure the endpoint device 160 to manage the movement of user 169 via the wearable unit(s) 165. For example, a caregiver via management device 162 may communicate with AS 145 and provide an instruction to cause AS 145 to download to the movement model to endpoint device 160. In turn, endpoint device 160 may then receive sensor readings, or sensor data from the sensor(s) of wearable unit(s) 165. In one example, the endpoint device 160 may compare the sensor data to the movement model. If the endpoint device determines that the sensor data is not in accordance with the movement model, e.g., a deviation from an ideal or a preferred motion of the movement model is detected, the endpoint device 160 may then provide a corrective action via the wearable unit(s) 165. For instance, the endpoint device 160 may send one or more control signals to control the actuator(s) of the wearable unit(s) 165. To illustrate, the wearable unit(s) 165 may comprise an elbow brace and the sensor readings may indicate that the user is performing a throwing motion in which the elbow is hyperextended. The endpoint device may then cause one or more actuators of the wearable unit(s) 165 to engage, which may resist and/or prevent the elbow from being hyperextended. Alternatively, or in addition, the endpoint device 160 may send one or more control signals to control the actuator(s) of the wearable unit(s) 165 to perform an example motion in accordance with the movement model. For instance, the actuator(s) may engage to cause the user 169 to perform a proper motion and to thereby remind or demonstrate to the user 169 the proper motion. In such an example, the actuator(s) of wearable unit(s) 165 may be engaged to move various bodily portions of the user 169 in the proper motion for a certain duration of time, e.g., for 20 seconds, 30 seconds, one minute, etc., or a number of demonstration cycles, e.g., 5 repetitions of the motion, 10 repetitions of the motion, etc.

In one example, the endpoint device 160 may also provide notifications to management device 162 and/or to AS 145. For instance, an alert may be sent to management device 162 whenever a corrective action is provided by then endpoint device 160. In another example, an hourly report, a daily report, etc. may be compiled by endpoint device 160 and sent to management device 162 and/or AS 145 reporting on a number of times endpoint device 160 provided a corrective action, the nature of the deviation from the movement model, and/or the nature of corrective action, and so forth. Management device 162 may also be used to provide assistance to user 169. For instance, a caregiver may direct a further movement model to be downloaded to endpoint device 160 via AS 145. For instance, if it appears that the movement model is too difficult for the user 169 to follow, the caregiver may select an easier movement model for the user 169. Similarly, if the user 169 has become tired of engaging in movements in accordance with a current movement model, the caregiver may direct the user to perform other motions in accordance with a different movement model which may assist in the user's training, recovery, etc.

Notably, the providing of corrective action by endpoint device 160 via the wearable unit(s) 165 may be undesirable or even dangerous in various situations. In one example, the user 169 may override corrective actions by providing a trigger condition, such as a gesture or voice command. For instance, the voice command or gesture may be captured via wearable unit(s) 165 or endpoint device 160, and may be sent to endpoint device 160 and/or AS 145 where the gesture or voice command may be recognized as a trigger condition and may cause endpoint device 160 and/or AS 145 to disengage corrective actions via the actuator(s) of the wearable unit(s) 165. For instance, user 169 may be recovering from a knee surgery and should not engage in impactful walking or running. Accordingly, endpoint device 160 may receive sensor data from wearable unit(s) 165 and perform corrective actions in accordance with a movement model for a preferred manner of walking that is appropriate for one who is in the process of knee surgery recovery. However, the user 169 may be in a situation where the risk if the user 169 does not run outweighs the risk of re-injuring the knee from running. For instance, the user 169 may believe that he or she is at risk of assault, may be in an open area as inclement weather approaches, may be in a crosswalk with a vehicle approaching that does not appear to be stopping, may be in an area with fast moving crowds, such as on a subway platform where the user 169 would like to retain the ability to react to unexpected movements of others (e.g., a sudden surging crowd), and so forth. In another example, a user may be recovering from an arm injury, and the movement model in effect at endpoint device 160 may prescribe certain movements of the arm of user 169. However, the user 169 may decide that it would be better to override the corrective action(s) of endpoint device 160 in accordance with the movement model in order to defend himself or herself, such as by throwing an object or raising the arms in self-defense, to engage in a complex movement to enter a hiding place, and so forth. In any of the above situations, the user 169 may speak a voice command or make a gesture comprising a trigger condition which will result in the disengaging of the corrective action.

In another example, the user 169 may simply be tired of engaging in the "proper" motion and may want to turn off the corrective actions. However, in one example, a notification may be provided to the management device 162 whenever the user 169 provides a trigger condition to disengage the corrective actions. Therefore, the caregiver associated with management device 162 may be made aware if the user 169 is not following a training or recovery program that is overseen by the caregiver. In still another example, the motion model may call for the user 169 to engage in a certain level of activity with respect to an arm, a leg, etc. For instance, at a certain point in a rehabilitation regimen, the caregiver may prefer for the user 169 to engage in regular arm movement. Thus, if the user fails to move the arm sufficiently, in accordance with the movement model, a corrective action may comprise activating the actuators of wearable unit(s) 165 to lightly swing the user's arm as user 169 walks. However, if the user 169 is injured and has a deep cut to the arm, it would be detrimental to have the actuator(s) engaging while the user is walking to get help and attempting to apply pressure to a wound. Thus, in such a situation the user 169 may also provide a trigger condition to disengage the corrective action.

In accordance with the present disclosure, one or more triggering conditions may be defined for disengaging the corrective action, e.g., via the actuator(s) of the wearable unit(s) 165. For example, the triggering condition may comprise an audio input or a physical gesture from the user 169. For instance, the endpoint device 160 may be configured to listen for a command from the user 169 via a microphone, such as the spoken word "disengage," or the like. In another example, the wearable units(s) 165 may include a unit for a hand of the user 169, where the user 169 may tap or squeeze two fingers together, may curl one or more fingers, etc. In one example, sensor(s) of the wearable unit(s) 165, e.g., attached to the user hand, may provide sensor readings to the endpoint device 160. The endpoint device 160 may then determine that at least a portion of the sensor readings comprises a command to disengage the corrective action via the actuator(s) of the wearable unit(s) 165. Accordingly, when the endpoint device 160 determines that a triggering condition is encountered, the endpoint device 160 may send one or more commands to disengage the corrective action via the wearable unit(s) 165.

It should be noted that the system 100 has been simplified. In other words, the system 100 may be implemented in a different form than that which is illustrated in FIG. 1. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of radio access network 120, converged network 130, and IMS network 150 are omitted for clarity, including gateways or border elements providing connectivity between such networks, internal routers within converged network 130, and so on. Similarly, due to the relatively large number of connections available between devices in the system 100, various links between MME 132, SGW 134, components 121 and 122, SMSC 180, PDN GW 138, and other components of system 100 are also omitted for clarity.

In addition, although aspects of the present disclosure have been discussed above in the context of a converged network with GSM/TDMA-based, GPRS/CDMA-based, and LTE/OFDMA-based components, examples of the present disclosure are not so limited. For example, the teachings of the present disclosure can be applied to networks and systems that use other types of wireless/cellular technologies, such as enhanced data rates for GSM evolution (EDGE), IS-95, or a future technology or standard-based network, e.g., a 5G network, and so forth. In one example, operations described above as being performed at endpoint device 160 may instead be performed at AS 145 and/or server 175, and vice versa. For instance, sensor readings from wearable unit(s) 165 may be forwarded to AS 145 and/or server 175, where AS 145 and/or server 175 may determine whether the sensor readings are in accordance with a movement model for the user 169, and may send control signals to wearable unit(s) 165 via endpoint device 160 if and when it is determined by AS 145 and/or server 175 that the sensor readings are not in accordance with the movement model. In another example, management device 162 may interact with endpoint device 160 without the use of AS 145 and/or server 175. For instance, management device 162 may download a movement model to endpoint device 160 directly, e.g., instead of sending a command to AS 145 and/or server 175 to download the movement mode to endpoint device 160. In still another example, endpoint device 160 may be integrated with wearable unit(s) 165, e.g., instead of comprising separate devices that communicate via IEEE 802.15 communications or the like. Thus, these and other modifications are all contemplated within the scope of the present disclosure.

Figure 2:
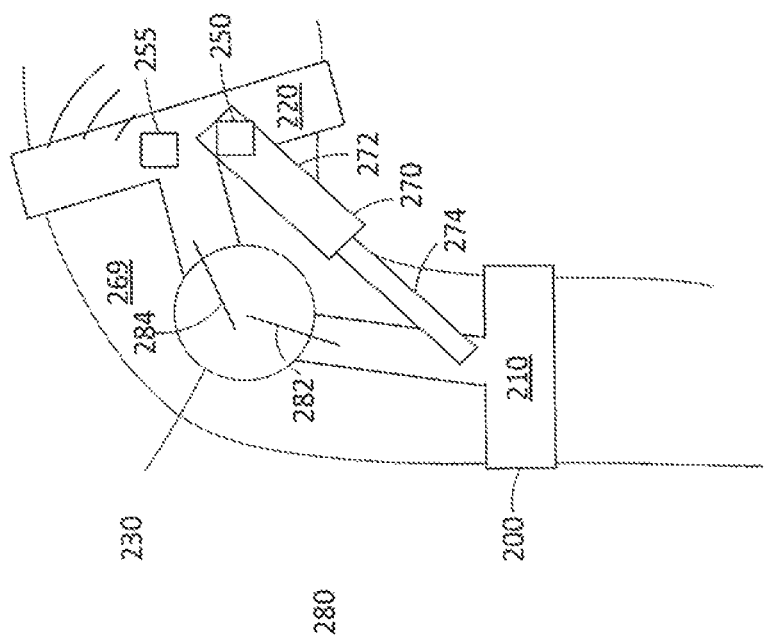
FIG. 2 illustrates an example wearable unit related to the present disclosure.

To further aid in understanding the present disclosure, FIG. 2 illustrates an example wearable unit 200. For instance, the wearable unit 200 may comprise a knee brace having a lower unit 210 joined to an upper unit 220 via a hinge 230 (note that the wearable unit 200 may include an additional hinge that is obscured by the knee of the user 269). As illustrated in FIG. 2, the wearable unit 200 further includes a controller 250, a transceiver 255, and an actuator 270. The wearable unit 200 may further include a sensor comprising portions 282 and 284, e.g., an electrical switch sensor, or a limit switch. For instance, when the knee of the user 269 is extended, the lower unit 210 and the upper unit 220 may be oriented such that the portions 282 and 284 come into contact and permit current to flow. In one example, the sensor may comprise a circuit that includes the controller 250 such that when the current flows, the controller 250 may detect that the wearable unit 200 is a position that should not be exceed. Alternatively, or in addition, the wearable unit 200 may include a sensor integrated into actuator 270 and coupled to the controller 250. For instance, as illustrated in FIG. 1, actuator 270 may comprise an electro-hydraulic actuator 270 including a cylinder 272 and a rod 274. The cylinder 272 may be connected to the upper unit 220, while the rod 274 may be connected to the lower unit 210 as illustrated. (Note that the wearable unit 200 may include a second actuator on the opposite side that is obscured by the knee of the user 269). In addition, the actuator 270 may include a pressure sensor or an electrical sensor via which the position of the rod 274 in relation to the cylinder 272 may be determined. Thus, relative positions or orientations of the lower unit 210 and the upper unit 220, and the state of the wearable unit 200 may be determined the controller 250.

The transceiver 255 may comprise a wireless transceiver for IEEE 802.11 based communications, IEEE 802.15 based communications, or the like, and may be used by the controller 250 communicate with an endpoint device of the user 269. For example, the controller 250 may report to the endpoint device sensor readings or send notifications when a sensor is triggered/activated. In addition, the controller 250 may receive instructions from the endpoint device for controlling the electro-hydraulic actuator 270. For instance, the controller 250 may generate electrical control signals based upon the instructions, which may increase or decrease pressure in the cylinder 272 and change the position of the cylinder 272 with respect to the rod 274. In turn, the position of the lower unit 210 may be changed with respect to the upper unit 220, thus changing a position of the knee of user 269. It should be noted that the example of FIG. 2 is provided for illustrative purposes and comprises just one example of a wearable unit that may be used in connection with examples of the present disclosure. For instance, other wearable units may include elbow braces, ankle supports, neck braces, and so forth. In addition, other wearable units may include various other types of sensors, different types of actuators, a different number of actuators or sensors, and so forth.

Figure 3:
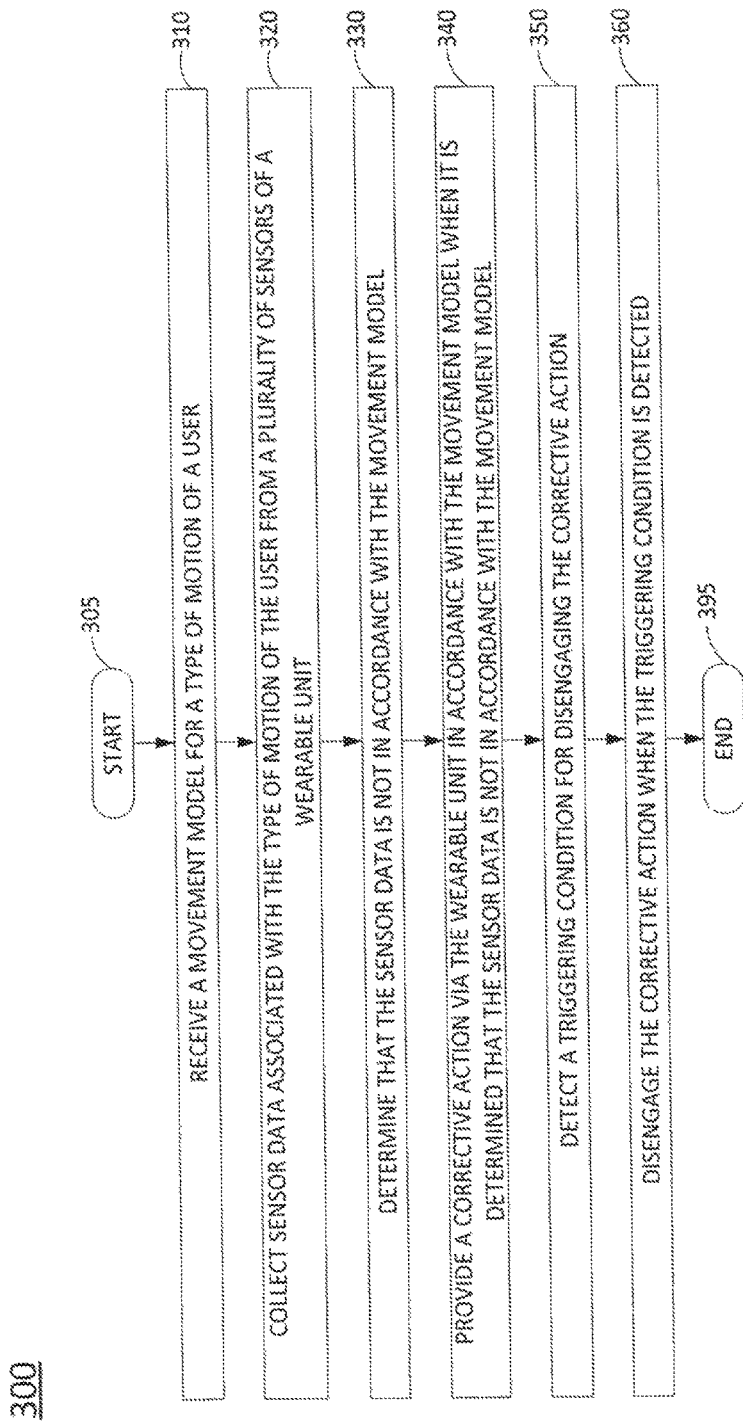
FIG. 3 illustrates a flowchart of an example method for disengaging a corrective action via a wearable unit.

FIG. 3 illustrates a flowchart of an example method 300 for disengaging a corrective action via a wearable unit, in accordance with the present disclosure. In one example, steps, functions and/or operations of the method 300 may be performed by an endpoint device or by a network-based device, such as endpoint device 160, AS 145, or server 175 in FIG. 1, or by any one or more of such devices in conjunction with other components of the system 100. In one example, the steps, functions, or operations of method 300 may be performed by a computing device or system 400, and/or processor 402 as described in connection with FIG. 4 below. For instance, computing device or system 400 may represent an endpoint device or a server for movement assistance, in accordance with the present disclosure. For illustrative purposes, the method 300 is described in greater detail below in connection with an example performed by a processor, such as processor 402. The method begins in step 305 and proceeds to step 310.

At step 310, the processor receives a movement model for a type of motion of a user. The movement model may comprise, for example, a series of states which may be associated with or correspond to sensor readings of one or more sensors of a wearable unit. For instance, the movement model may comprise an ideal or preferred type of motion for the user to engage in. The movement model may also include one or more states which are indicative of a risk of injury or a danger to the user. In one example, the movement model may be received from a monitoring device, e.g., a device of a caregiver of the user, or from a network-based server storing the movement model.

At step 320, the processor collects sensor data associated with the type of motion of the user from a plurality of sensors of the wearable unit. The wearable unit may comprise, for example: an elbow brace, a knee brace, a wrist brace, a glove, a shoe, and so forth, or a combination of such components. In one example, the plurality of sensors may include any one or more of: a pressure sensor, a magnetometer, a compass, a gyroscope, an accelerometer, a piezoelectric transducer, a magnetic gate, a light gate, or the like.

At step 330, the processor determines that the sensor data is not in accordance with the movement model. For instance, the sensor data may indicate a state or a series of state transitions that is associated with a type of motion and/or a position that is a risk to the user, such as a hyperextension, an impact or a load in excess of a threshold, an improper posture, and so forth, or may simply indicate a deviation from a preferred or ideal motion in accordance with the movement model.

At step 340, the processor provides a corrective action via the wearable unit in accordance with the movement model when it is determined that the sensor data is not in accordance with the movement model. For instance, the processor may send one or more control signals to control one or more actuators of the wearable unit. For example, the wearable unit may comprise an elbow brace and the sensor readings may indicate that the user is performing a throwing motion in which the elbow is hyperextended. The processor may then cause one or more actuators of the wearable unit to engage, which may resist and/or prevent the elbow from being hyperextended. Alternatively, or in addition, the processor may send one or more control signals to control the actuator(s) of the wearable unit to perform an example motion in accordance with the movement model. For instance, the actuators may engage to cause the user to perform a proper motion and to thereby remind or demonstrate to the user the proper motion.

At step 350, the processor detects a triggering condition for disengaging the corrective action. For instance, the triggering condition may comprise an audio input or a physical gesture received from the user. An audio input may comprise, for example, a command from the user captured via a microphone, such as the spoken word "disengage," or the like. In another example, the wearable unit may include a portion for a hand of the user, where the user may tap or squeeze two fingers together, may curl one or more fingers, etc. In one example, sensor(s) of the wearable unit, e.g., attached to the user hand, may provide sensor readings to the processor, which may then determine that at least a portion of the sensor readings comprises a command to disengage the corrective action via the actuator(s) of the wearable unit.

At step 360, the processor disengages the corrective action when the triggering condition is detected. For instance, the processor may send one or more commands or instructions to disengage the corrective action via the wearable unit. Thus, in accordance with the present disclosure the user is able to quickly override the corrective action in various types of situations at the user's discretion.

Following step 360, the method 300 proceeds to step 395 where the method 300 ends.

It should be noted that the method 300 may be expanded to include additional steps, may be modified to perform different steps, or may omit certain steps. For instance, in one example, the processor may send a notification to a monitoring device when a corrective action is provided at step 340, when a triggering condition is detected at step 350 and/or when the corrective action is disengaged at step 360, and so forth. In another example, the processor may determine that the user frequently seeks to disengage the corrective action by providing a triggering condition at or around the same time each day. For instance, the user may seek a 30 minute break each day around 3:30 in the afternoon. In such case, the processor may determine that the corrective action should be disengaged at this time moving forward, e.g., after a week in which the user has sought to disengage the corrective action during the same time slot. In still another example, the triggering condition may be detected at the wearable unit and the corrective action may be disengaged locally, e.g., without involvement of the processor. Thus, the disengaging of the corrective action may not be dependent upon a cellular connection and/or a wireless and/or wired local connection from the wearable unit to an endpoint device of the user. In still another example, the processor may provide audio or visual feedback to the user, e.g., via a speaker, a headset, and/or a display of an endpoint device of the user. For instance, the processor may send an instruction to the endpoint device to cause the endpoint device to present an audio message for the user warning the user that a corrective action is about to be activated, to present an audio or visual reminder of the proper motion, and so on. Thus, these and other modifications are all contemplated within the scope of the present disclosure.

In addition, it should be noted that although not specifically specified, one or more steps, functions or operations of the method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the example embodiments of the present disclosure.

Figure 4:
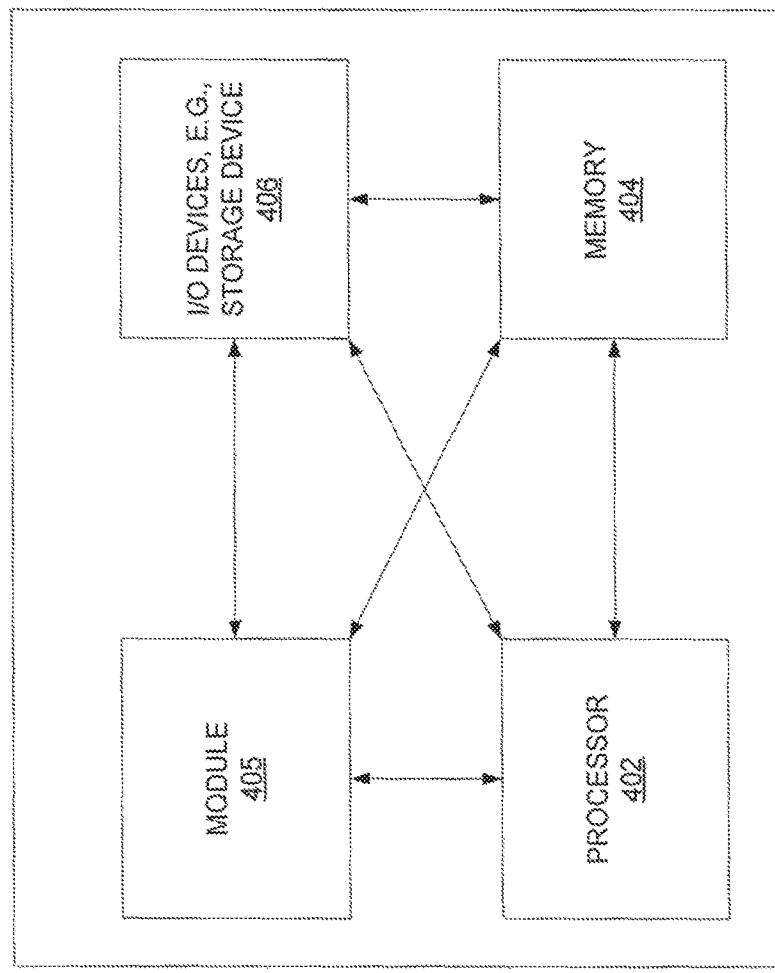
FIG. 4 illustrates an example high-level block diagram of a computer specifically programmed to perform the steps, functions, blocks, and/or operations described herein.

FIG. 4 depicts a high-level block diagram of a computing device specifically programmed to perform the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for disengaging a corrective action via a wearable unit, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one embodiment, instructions and data for the present module or process 405 for disengaging a corrective action via a wearable unit (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for disengaging a corrective action via a wearable unit (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
   a processor; and
   a computer-readable medium storing instructions which, when executed by the processor, cause the processor to perform operations, the operations comprising:
      collecting sensor data associated with a type of motion of a user from a plurality of sensors of a wearable unit;
      determining that the sensor data is not in accordance with a movement model;
      providing a corrective action via the wearable unit in accordance with the movement model when it is determined that the sensor data is not in accordance with the movement model;
      detecting a triggering condition for disengaging the corrective action; and
      disengaging the corrective action when the triggering condition is detected.

2. The device of claim 1, wherein the triggering condition comprises an audio input from the user.

3. The device of claim 1, wherein the triggering condition comprises a physical gesture of the user.

4. The device of claim 3, wherein the physical gesture of the user is detected via the plurality of sensors.

5. The device of claim 1, wherein the movement model is received from a device deployed within a telecommunication service provider network.

6. The device of claim 1, wherein the movement model is received from a device associated with a caregiver that is authorized by the user.

7. The device of claim 1, wherein the plurality of sensors comprises at least one of: a pressure sensor, a magnetometer, a compass, a gyroscope, an accelerometer, a piezoelectric transducer, a magnetic gate, or a light gate.

8. The device of claim 1, wherein the wearable unit includes at least one actuator comprising at least one of: an electric actuator, a hydraulic actuator, or a variable force solenoid.

9. The device of claim 8, wherein the corrective action is provided via the at least one actuator.

10. The device of claim 1, wherein the device comprises one of:
    a mobile endpoint device of the user; or
    a server deployed in a telecommunication network.

11. A non-transitory computer-readable medium storing instructions which, when executed by a processor, cause the processor to perform operations, the operations comprising:
    collecting sensor data associated with a type of motion of a user from a plurality of sensors of a wearable unit;
    determining that the sensor data is not in accordance with a movement model;
    providing a corrective action via the wearable unit in accordance with the movement model when it is determined that the sensor data is not in accordance with the movement model;

detecting a triggering condition for disengaging the corrective action; and disengaging the corrective action when the triggering condition is detected.

12. The non-transitory computer-readable medium of claim 11, wherein the triggering condition comprises an audio input from the user.

13. The non-transitory computer-readable medium of claim 11, wherein the triggering condition comprises a physical gesture of the user.

14. The non-transitory computer-readable medium of claim 13, wherein the physical gesture of the user is detected via the plurality of sensors.

15. The non-transitory computer-readable medium of claim 11, wherein the movement model is received from a device deployed within a telecommunication service provider network.

16. The non-transitory computer-readable medium of claim 11, wherein the movement model is received from a device associated with a caregiver that is authorized by the user.

17. The non-transitory computer-readable medium of claim 11, wherein the plurality of sensors comprises at least one of: a pressure sensor, a magnetometer, a compass, a gyroscope, an accelerometer, a piezoelectric transducer, a magnetic gate, or a light gate.

18. The non-transitory computer-readable medium of claim 11, wherein the wearable unit includes at least one actuator comprising at least one of: an electric actuator, a hydraulic actuator, or a variable force solenoid.

19. The non-transitory computer-readable medium of claim 18, wherein the corrective action is provided via the at least one actuator.

20. A method comprising:
collecting, by a processor, sensor data associated with a type of motion of a user from a plurality of sensors of a wearable unit;
determining, by the processor, that the sensor data is not in accordance with a movement model;
providing, by the processor, a corrective action via the wearable unit in accordance with the movement model when it is determined that the sensor data is not in accordance with the movement model;
detecting, by the processor, a triggering condition for disengaging the corrective action; and
disengaging, by the processor, the corrective action when the triggering condition is detected.

* * * * *